United States Patent [19]

Kurker

[11] Patent Number: 5,796,778
[45] Date of Patent: Aug. 18, 1998

[54] RECEIVER CIRCUIT HAVING ADAPTIVE EQUALIZER WITH CHARACTERISTICS DETERMINED BY SIGNAL ENVELOPE MEASUREMENT AND METHOD THEREFOR

[75] Inventor: Christopher M. Kurker, Fort Collins, Colo.

[73] Assignee: Symbios, Inc., Fort Collins, Colo.

[21] Appl. No.: 534,228

[22] Filed: Sep. 26, 1995

[51] Int. Cl.⁶ .............................. H03H 7/30; H03H 7/40; H03Q 1/20
[52] U.S. Cl. .............................. 375/229; 333/28 R
[58] Field of Search ...................... 375/229, 232, 375/285, 346, 348, 325, 375, 385, 350, 345, 318, 319; 330/254, 278, 302, 304; 364/724.2; 333/28 R

[56] References Cited

U.S. PATENT DOCUMENTS

| | | |
|---|---|---|
| 4,003,006 | 1/1977 | Mandeville et al. |
| 4,028,626 | 6/1977 | Motley et al. .............................. 375/235 |
| 4,507,793 | 3/1985 | Adams ............................................ 375/36 |
| 4,707,840 | 11/1987 | Nakayama |
| 4,887,278 | 12/1989 | Gupta ............................................... 375/7 |
| 4,888,560 | 12/1989 | Ogura ........................................... 330/254 |
| 4,943,789 | 7/1990 | Surie ............................................. 333/18 |
| 5,293,405 | 3/1994 | Gersbach et al. |
| 5,323,423 | 6/1994 | Townsend et al. ......................... 375/14 |
| 5,361,400 | 11/1994 | Kazecki et al. ........................... 455/63 |
| 5,448,589 | 9/1995 | McKibben ................................. 375/230 |

OTHER PUBLICATIONS

An Intersymbol Interference Cancellation Equaliser for Use in Systems Employing Envelope Detection; B. Farhang-Boroujeny, B.S.C., M. Eng., and Prof. L.F. Turner, Ph.D.; IEEE Proc., vol. 127, Pt. F, No. 6, Dec. 1980.

Primary Examiner—Wellington Chin
Assistant Examiner—Jean B. Corrielus
Attorney, Agent, or Firm—Wayne P. Bailey

[57] ABSTRACT

Circuitry, and an associated method, for a receiver which receives data signals transmitted upon a non-ideal transmission channel. The circuitry includes an equalizer circuit and a variable gain amplifier circuit together operable to counteract the effects of the signal degradation. Characteristics of the equalizer circuit and of the amplifier circuit are together selected responsive to detection of the signal envelope of the data signal.

23 Claims, 8 Drawing Sheets

RECEIVER CIRCUIT HAVING ADAPTIVE EQUALIZER WITH CHARACTERISTICS DETERMINED BY SIGNAL ENVELOPE MEASUREMENT AND METHOD THEREFOR

FIELD OF THE INVENTION

The present invention relates generally to a receiver having an equalizer circuit for counteracting the effects of signal degradation of a data signal transmitted to the receiver upon a transmission channel. More particularly, the present invention relates to circuitry, and an associated method, for a receiver including an adaptive equalizer and a variable gain amplifier wherein the adaptive characteristics of the equalizer and the gain of the amplifier are together selected responsive to determinations of the magnitude of the envelope of the data signal received at the receiver.

BACKGROUND OF THE INVENTION

A communication system which transmits data between two locations includes, at a minimum, a transmitter and a receiver wherein the transmitter and the receiver are interconnected by a transmission channel upon which a data signal (which contains data) is transmitted.

A certain amount of signal degradation occurs when any signal is transmitted upon an actual transmission channel. When the data signal is formed of a digitally-modulated signal, signal degradation occurs inter alia., as a result of intersymbol interference.

When the transmission channel is formed of wire pair channels, such as unshielded twisted pairs (UTP) or shielded twisted pairs (STP), the amount of signal degradation is dependent, in part, upon the quality of the wire pairs and the length of the wire pairs. Significant amplitude and phase distortion of the transmitted data signal sometimes occurs. Such signal degradation reduces the quality of the communication between a transmitter and receiver.

A local area network (LAN) is exemplary of a communication system which utilizes wire pair channels. A plurality of LAN transceivers are typically connected together by the wire pair channels.

Various data transmission standards have emerged for the transmission of data in LANs. For instance, several standards utilize pulse amplitude modulation (PAM) signaling in which data is encoded by selected encoded schemes having a small number of signal levels. Nonreturn-to-zero (NRZ), MLT-3, and 8B6T are three of such encoding schemes. The data forming the data signal is encoded according to a selected encoding scheme, and the encoded data is modulated upon a carrier. The modulated data signal is transmitted over the transmission channel and is received by a receiver. In the example of a LAN, a data signal is transmitted between LAN transceivers.

Once the data signal is received, the data signal is demodulated to recover the data content of the signal. Because signal degradation reduces the quality of the communication between a transmitter and a receiver, various circuits and methods have been developed to counteract the effects of the signal degradation.

Equalizer circuitry, both of software and hardware implementations, is known, and is utilized to correct for the effects of signal degradation upon a transmission channel. An equalizer typically exhibits a frequency response which approximates the inverse of the frequency response of the transmission channel upon which the data signal is transmitted.

At any particular frequency in the pass band of the data signal, the magnitude characteristic of the equalizer exhibits a gain equal to the inverse of the attenuation of the data signal at that frequency when transmitted upon the transmission channel. Analogously, the phase characteristics of the equalizer are the inverse of the phase distortion introduced upon the data signal during transmission upon the transmission channel.

The equalizer is said to be "under-equalized" when the magnitude characteristic of the equalizer is less than the inverse of the channel magnitude. As a result, the equalized signal generated by the equalizer undershoots the amplitudes of the actual, transmitted data signal especially during short periods when the signal has too little time to settle. When the equalizer is under-equalized, the equalized signal also exhibits slower-than-transmitted rise times.

The equalizer is said to be "over-equalized" when the magnitude characteristics of the equalizer are greater than the inverse of the channel magnitude. As a result, the equalized signal generated by the equalizer overshoots the amplitude of the actual, transmitted data signal even for short periods.

Because the characteristics of the transmission channel are not constant, the signal degradation of the data signal transmitted thereupon varies. To properly counteract the effects of the signal degradation, therefore, many existing equalizers are adaptive, that is to say, circuitry including the equalizer is capable of sensing variations in the transmission channel characteristics and to vary the characteristics of the equalizer responsive thereto. Existing adaptive equalizers typically utilize digital filters having coefficients updated through execution of algorithms; others typically require large numbers of gates operating at speeds in excess of the data symbol rate of the receive signals applied thereto.

Existing equalizers which adequately counteract the effects of signal degradation of a data signal transmitted upon an adaptive transmission channel are therefore typically fairly complex. A circuit which adaptively corrects for signal degradation of a signal transmitted upon a transmission channel which is of reduced complexity would therefore be advantageous.

SUMMARY OF THE INVENTION

It is accordingly an object of the present invention to provide circuitry of reduced complexity, and an associated method, which adaptively counteracts the effects of signal degradation of a data signal transmitted upon a transmission channel.

In accordance with the present invention, the above object is accomplished by a receiver circuit having an adaptive equalizer and a variable gain amplifier wherein the characteristics of the equalizer and the gain of the amplifier are selected in response to measurements of the sizes of the signal envelopes of data signals transmitted upon a transmission channel as they appear at the equalizer output.

An adaptive equalizer circuit is coupled to receive a receive signal representative of the data signal. The adaptive equalizer circuit equalizes the receive signal and generates an equalized signal. A variable gain amplifier circuit amplifies the equalized signal and forms an amplified signal. An envelope detector is coupled to detect magnitudes of the signal envelopes of the amplified signal. The detected magnitudes of the signal envelopes are utilized to select the adaptive characteristics of the adaptive equalizer and to select the variable gain characteristics of the variable gain amplifier.

Because the present invention utilizes detection of the size of the signal envelope of the data signals transmitted upon the transmission channels, the circuit is of minimal complexity. The data signal can be assumed to be formed of random data during the adaptation process of selecting the characteristics of the adaptive and variable circuitry. The circuitry and method of the present invention can also be advantageously utilized in a receiver receiving data signals having data encoded by a wide variety of signaling schemes. The circuitry is amenable to both analog and digital realization and is robust over channel variations of the transmission channel and in manufacturing variations in the receiver in which the circuitry is embodied.

The present invention is particularly amenable for use in a local area network (LAN). Receiver portions of LAN transceivers of the LAN include the circuitry of the present invention to counteract the effects of signal degradation of signals transmitted upon the wire pairs connecting the transceivers.

A more complete appreciation of the present invention and the scope thereof can be obtained from the accompanying drawings which are briefly summarized below, the following detailed description of the presently preferred embodiment of the invention, and the appended claims.

DETAILED DESCRIPTION

Figure 1:
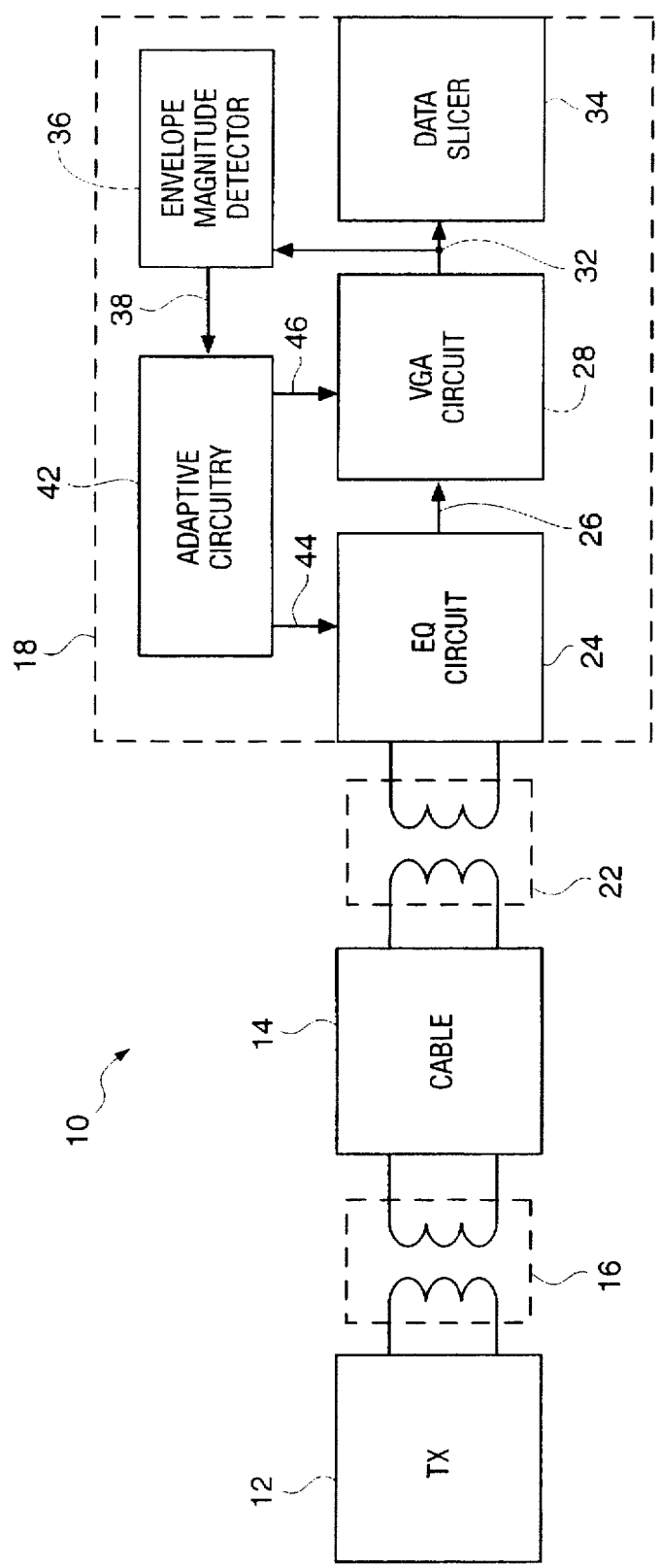
FIG. 1 is a functional block diagram of a communication system of an embodiment of the present invention, here a portion of a local area network.

Referring first to FIG. 1, a communication system, shown generally at 10, which includes the circuitry of an embodiment of the present invention is shown. The communication system 10 is here illustrated as a portion of a local area network (LAN). It should be noted at the outset, however, that the circuitry of the present invention may be utilized to form portions of receivers of any of many other communication systems.

The communication system 10 includes a transmitter 12 operative to modulate data to form a data signal to permit the transmission thereof. In a LAN of one embodiment of the present invention, the transmitter 12 modulates data using a pulse amplitude modulation (PAM) technique to form a digitally-modulated data signal.

The data signal formed by the transmitter is transmitted upon a transmission channel, here a cable 14 formed of a twisted wire pair having first ends coupled to the transmitter 12 by way of an isolation transformer 16.

A second side of the cable 14 is coupled to a receiver 18, also by way of an isolation transformer, here transformer 22. The receiver 18 includes an equalizer circuit 24 coupled to receive a receive signal, representative of the data signal transmitted by the transmitter 12 upon the cable 14 and received at the receiver 18. While not shown in the figure, the receiver 18 typically also includes demodulation circuitry for demodulating the data signal received thereat, and the receive signal applied to the equalizer circuit 24 is therefore typically formed of a demodulated signal, demodulated by such demodulation circuitry.

The equalizer circuit 24 is operative to equalize the receiver signal applied thereto and generate an equalized signal on line 26 for application to a variable gain amplifier circuit 28.

The variable gain amplifier circuit 28 is operative to amplify the equalized signal and to generate an amplified signal on line 32 for application to a data slicer 34 and to an envelope magnitude detector 36. The data slicer 34 is operative in conventional manner to determine signal values of the amplified signal generated by the amplifier circuit 28. The envelope detector 36 is operative to detect sizes of the signal envelope of the data signal received by the receiver 18, once equalized by the equalizer circuit 24 and amplified by the amplifier circuit 28.

The envelope magnitude detector 36 generates signals on line 38 representative of the size of the envelope detected thereat. Line 38 is coupled to adaptive circuitry 42. The adaptive circuitry 42 is operative responsive to the values of the signals generated on the line 38 to select values of the adaptive characteristics of the equalizer circuit 24 and the gain of the variable gain amplifier circuit 28. The selectability of the values of the adaptive characteristics of the circuit 24 and of the gain of the circuit 28 alter the transfer characteristics of such circuits. The adaptive circuitry 42 generates signals on lines 44 and 46 which are coupled to the equalizer circuit 24 and the amplifier circuit 28, respectively, to select such adaptive characteristics and gain values, and alter the transfer characteristics of the circuits 24 and 28 respectively.

Because the cable 14 forming the transmission channel upon which the data signal generated by the transmitter 12 is transmitted is not an ideal transmission channel, the data signal transmitted thereupon is distorted during transmission thereupon to cause signal degradation of the data signal.

The equalizer circuit 24 and the amplifier circuit 28 of the receiver 18 are together operative to counteract the effects of the signal degradation of the data signal. Through operation of the envelope magnitude detector 36 and the adaptive circuitry 42 in a feedback loop arrangement, the values of the adaptive characteristics of the equalizer circuit 24 and the gain of the amplifier circuit 28 are selected and altered to alter the transfer characteristics of the circuits, as necessary.

As the characteristics of the cable 14 forming the transmission channel change, the characteristics and gain of the equalizer circuit and amplifier circuits 24 and 28, respectively, are altered, thereby to adaptively correct for the change in characteristics of the transmission channel. More particularly, through operation of the circuitry of the receiver 18, the pulse shape and amplitude of the data signal actually transmitted by the transmitter 12 is restored. Once restored, the signal has minimal jitter and is of a proper amplitude such that the data slicer 34 is able to determine accurately the values of the data signal actually transmitted by the transmitter 12.

The equalizer circuit 24 provides high frequency boost to provide amplitude and phase equalization to reduce intersymbol interference caused by transmission of the data signal upon the cable 14 forming the transmission channel. The gain of the amplifier circuit 28 counters the attenuation of the data signal caused during transmission of the signal upon the cable 14 and, if applicable, also in the equalizer circuit 24.

The adaptive circuitry 42 controls both the adaptive characteristics of the equalizer circuit 24 and the gain of the amplifier circuit 28 in tandem. The settings of the gain selected by the adaptive circuitry 42 are directly tied to the adaptive characteristics, i.e., the equalizer boost settings, or pole/zero settings of the equalizer circuit 24. Such direct tying together of the characteristics can be contrasted with a non-envelope based selection scheme in which the minimization of the intersymbol interference and the normalization of signal amplitude are selected independently, viz., the values are independently determined. In a non-envelope based selection scheme, amplitude control is, for example, attained by the use of an automatic gain control loop for controlling the gain characteristics of the amplifier circuit 28.

Twisted wire pairs, of which cables similar to the cable 14 may form portions, exhibit characteristics analogous to the characteristics of conventional transmission lines. Conventional transmission lines are of a low pass nature and exhibit magnitude attenuations at any frequency (including DC levels) which is proportional to the length of the transmission line. By quantifying the characteristics of classes of transmission channels, such as the transmission channel formed of a twisted wire pair including a cable such as the cable 14, a parameterization of the class of channels can be obtained.

Figure 2A:
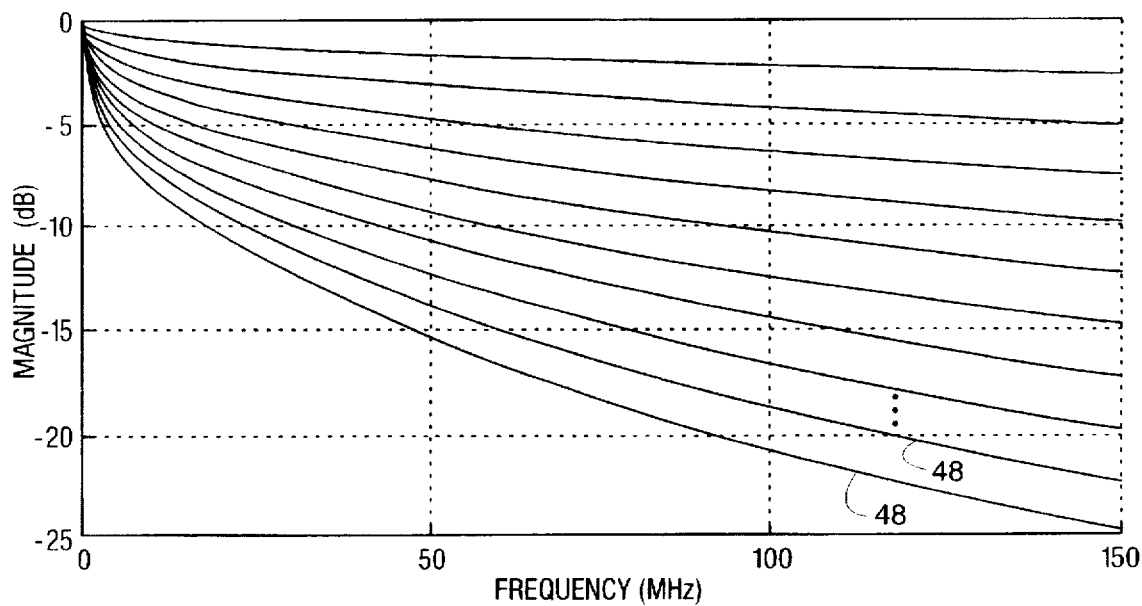
FIG. 2A is a graphical representation illustrating the magnitude characteristics of the frequency response of a typical family of twisted pair cables of various lengths, any of which can form a transmission channel for the transmission of a data signal thereupon, plotted as a function of frequency.

FIG. 2A illustrates the plots of the magnitude characteristics of a family of twisted pair cables of varying lengths. The plots 48 are formed by plotting the magnitude drop, in decibels (dB), as a function of frequency of data signals transmitted thereupon. Plots 48 are formed of cables of varying lengths. A data signal transmitted upon a cable of increased length exhibits a greater magnitude drop than a signal transmitted upon a cable of a smaller length. Accordingly, in the figure, plots 48 exhibiting greater magnitude drops are representative of data signals transmitted upon cables of greater lengths.

A data signal transmitted on a transmission channel exhibiting magnitude characteristics of any of the plots 48 shown in FIG. 2A exhibits a magnitude drop and, hence, signal degradation during transmission upon the cable.

Figure 2B:
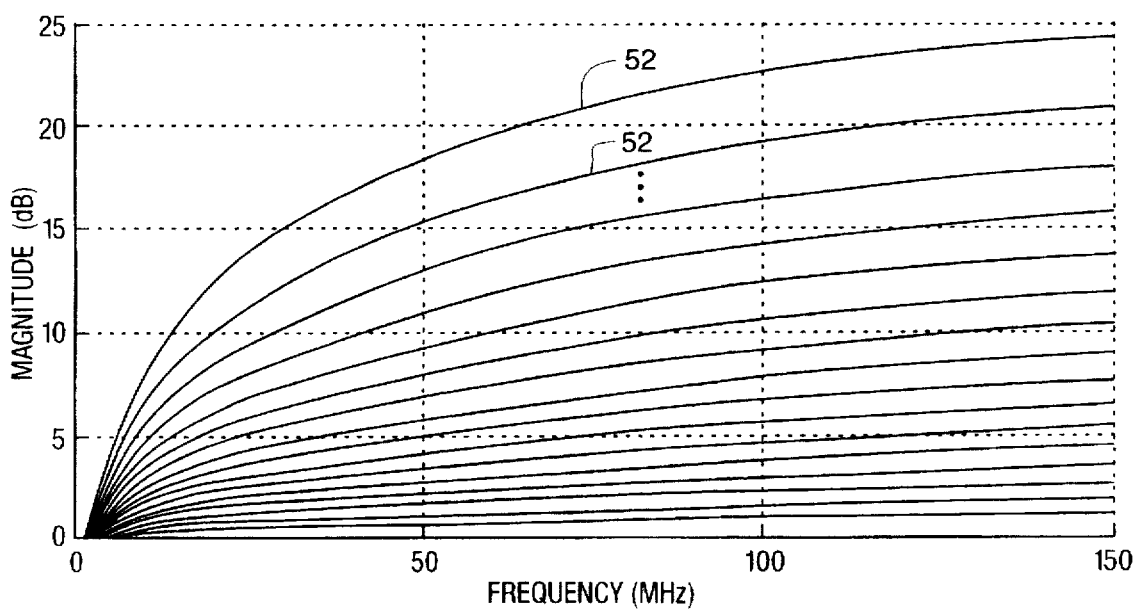
FIG. 2B is a graphical representation of the magnitude characteristics of the frequency response of an adaptive equalizer forming a portion of the communication system shown in FIG. 1 taken at various different settings of the equalizer, and plotted as a function of frequency.

FIG. 2B plots the magnitude characteristics of an equalizer circuit, such as the equalizer circuit 24 shown in FIG. 1, at various equalizer settings. The curves 52 are formed by plotting the magnitude, in decibels (dB), as a function of frequency, of a signal applied to the equalizer. The curves 52 are representative of the magnitude characteristics of an equalizer realized by a programmable filter of relatively low order in conventional analog implementations.

By properly selecting the setting of the equalizer, i.e., by matching the adaptive characteristics of the equalizer with the magnitude characteristics of the transmission channel upon which a data signal is transmitted to a receiver, correction can be made for signal degradation of the data signal.

When the technical standards and specifications for a communication system, such as a LAN are known, the allowable values of the signal magnitudes of data signals generated by the transmitter in the system are known. The circuitry of the receiver can be constructed such that the data signal received by the receiver can be considered to be optimally equalized when the magnitude of the detected signal envelope is of the same signal magnitudes as the signal magnitudes specified to be permitted in the communication system. The optimal equalization may alternately be considered to be some amplified level of the specified allowable signal levels. In other words, optimal equalization is defined to occur when the magnitude of the signal envelope of a data signal received by the receiver corresponds to, or is proportional to, specified allowable signal levels of a data signal transmitted in the communication system.

Figure 3:
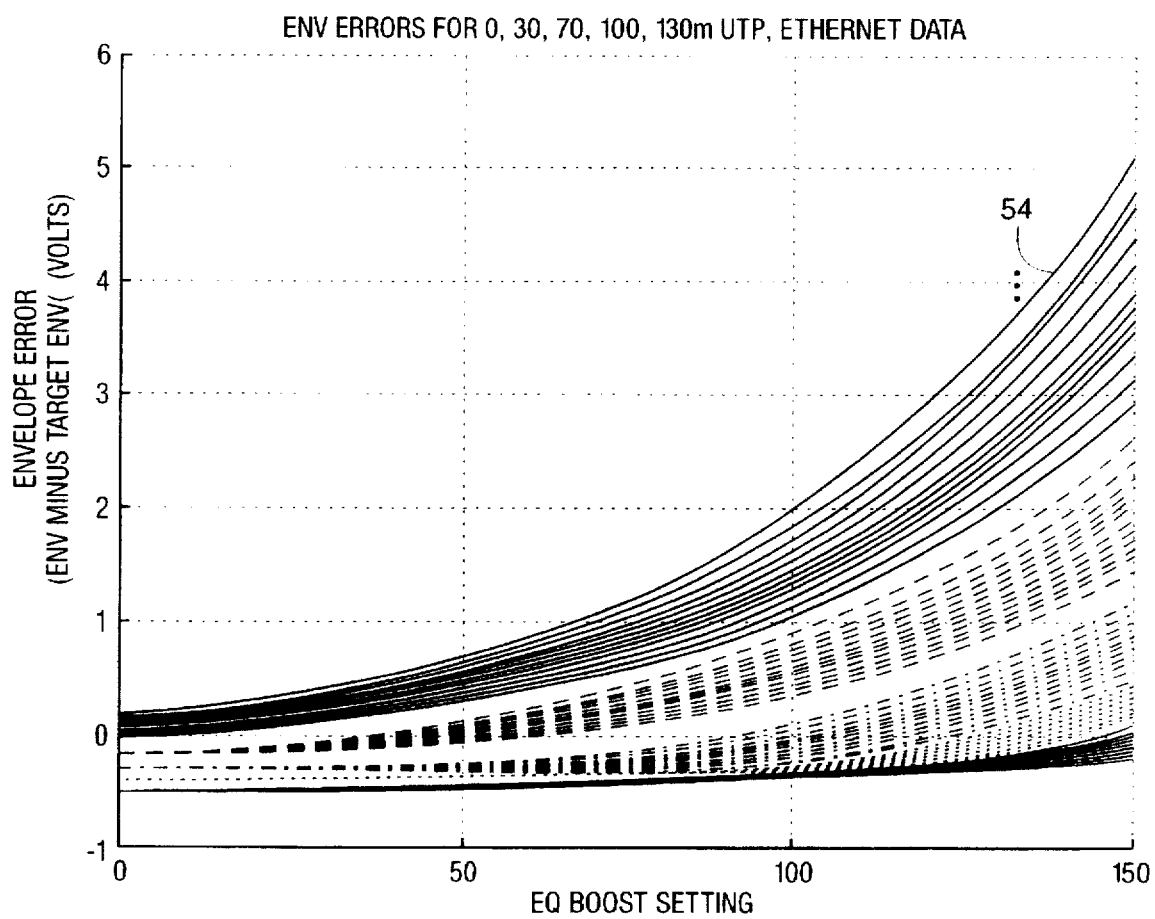
FIG. 3 is a graphical representation illustrating the levels of envelope error of data signals transmitted upon cables of varying lengths of the communication system shown in FIG. 2, plotted as a function of the magnitude characteristics of an equalizer, also forming a portion of the communication system shown in FIG. 1.

FIG. 3 illustrates plots of curves 54 formed by plotting a value of envelope error at various equalizer boost settings. The envelope error is defined to be the difference between the magnitude of the measured signal envelope and specified, allowable values of a signal envelope defined by the specifications of a communication system.

A plurality of curves 54 are illustrated in the figure. The various curves 54 are formed of plots for equalizer boost settings to counteract signal degradation caused by transmission channels of different characteristics, such as transmission channels of different cable lengths and operating conditions such as temperature.

Examination of the curves 54 indicates that each of the curves 54 displays a section having a relatively low slope, a section having a relatively large slope, and a "knee" area at which the curve transitions from a small slope to a large slope.

Figure 4:
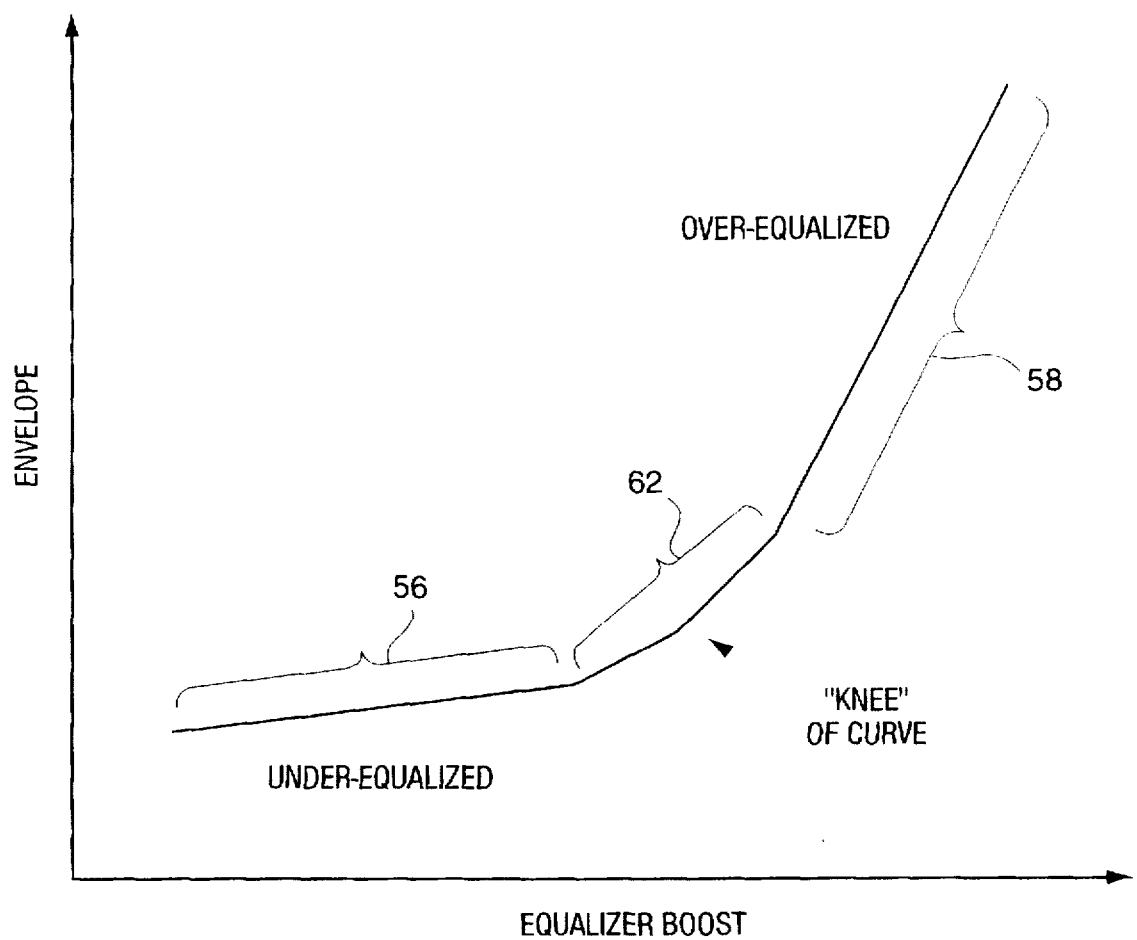
FIG. 4 is a graphical representation of a representative curve plotted in FIG. 3.

FIG. 4 illustrates a single curve 54 illustrating, in slightly exaggerated form, the various sections of the curve. A first section 56 is of relatively small slope. A second section 58 is of relatively large slope, and a third section, referred to as the knee section, 62 connects the first and second sections 56 and 58. The section 56 is representative of times in which the equalizer is of gain characteristics to be under-equalized and the section 58 is representative of times in which the equalizer is of gain characteristics to be over-equalized. In one embodiment of the present invention, described with respect to FIG. 7 below, detection of the knee section is utilized to optimally select the adaptive characteristics and gain of the equalizer and gain circuits.

Figure 5:
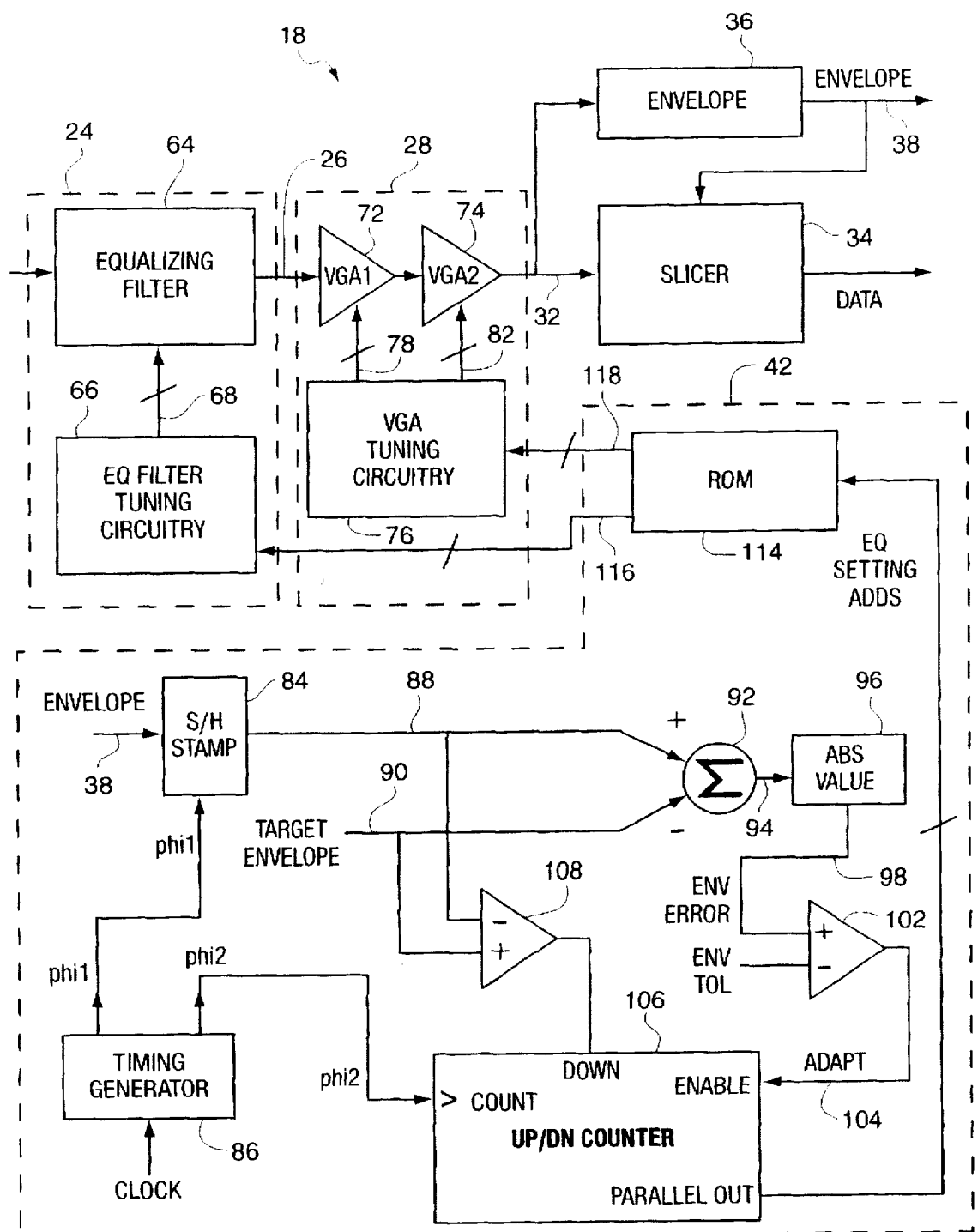
FIG. 5 is a functional block diagram of the circuitry of an embodiment of the present invention which counteracts for the effects of signal degradation of a signal transmitted on a non-ideal transmission channel.

FIG. 5 illustrates portions of the receiver 18 of an embodiment of the present invention in greater detail. The receiver 18 is again shown to include an equalizer circuit 24, a variable gain amplifier circuit 28, a data slicer 34, an envelope magnitude detector 36, and adaptive circuitry 42.

A signal representative of the receive signal is applied to an equalizing filter 64. The equalizing filter 64 is of adaptive characteristics which are controlled by equalizer filter tuning circuitry 66 by way of lines 68. That is to say, the transfer characteristics of the filter 64 are controlled by the tuning circuitry 66. The equalizer filter 64 generates an equalized signal on the line 26 interconnecting the equalizer circuit 24 and the variable gain amplifier circuit 28.

The circuit 28 includes a cascaded pair of amplifiers 72 and 74 wherein the amplifier 72 is coupled to the line 26 to receive the equalized signal thereat. The amplifier 72 and 74 are coupled to variable gain amplifier tuning circuitry 76 by way of lines 78 and 82. The variable gain amplifier 72 and 74 each have variable gains, and the tuning circuitry 76 controls the gain and, hence, the transfer characteristics of the amplifier. One of the amplifiers 72 or 74 is controlled to provide a gain component that equals the expected inverse cable gain corresponding to the pole/zero settings of the equalizing filter 64.

The amplified signal amplified by the circuit 28 is generated on the line 32. Line 32 is coupled to the data slicer 34 and to the envelope magnitude detector 36. The detector 36 detects the magnitude of the data signal, once equalized by the equalizer circuit 24 and amplified by the amplifier circuit 28. Signals representative of the detected size of the signal envelope are generated on line 38 and are applied to the adaptive circuitry 42.

More particularly, the line 38 is coupled to an input of a sample and hold circuit 84. The circuit 84 is operative to sample and hold segments of the signal generated by the detector 36. The sample and hold circuit 84 samples and holds signals for periods of time determined by the duration of a timing signal, referred to by $\phi_1$ generated by timing generator 86. The length of the timing signal $\phi_1$ defines a fixed-length window causing the sample and hold circuit 84 to hold values of the signal generated on the line 38 by the detector 36. The values of the signal portions held by the circuit 84 are generated on line 88 and are applied to a positive input of a summer 92. Values referred to as a target envelope are applied on line 90 to a negative input of the summer 92. The values of the target envelope correspond with values of the preselected, optimal data signal envelope sizes. When the data signal received at the receiver 18 is of an optimally-sized envelope, the signals generated on line 88 correspond in value with the values of the target envelope.

When the values of the signals generated on the line 88 differ with values of the target envelope, the summer 92 generates a difference signal of either a positive or negative value on line 94. The absolute value of the signal is determined by the absolute value detector 96, and the absolute value of the difference signal is applied by way of line 98 to an input of a comparator 102. The difference signal is representative of the envelope error between the size of the envelope of the receive signal, once equalized and amplified, with a desired signal envelope level as defined by the target envelope.

The comparator compares the absolute value of the difference signal with a tolerance level, applied to a second input of the comparator 102. The comparator 102 generates an output signal on the line 104 when the difference signal is of a magnitude greater than the tolerance level.

The line 104 is coupled to an enable input of an up/down counter 106. A timing signal, shown as $\phi_2$, also generated by the timing generator 86, is applied to a counter input of the counter 106 to enable the counter 106 to count up or count down during times in which the timing signal and the signal generated on line 104 are both applied to the counter.

The adaptive circuitry further includes a comparator 108 having inputs coupled to the lines 88 and 90. An output of the comparator 108 is applied to a down input of the counter 106. When the values of the signals generated on the line 88 are greater than the value of the signals generated on the line 90, the comparator generates an output signal which causes the counter to count down; otherwise, the counter counts up when the timing signal and the signal on line 104 are applied to the count and enable inputs, respectively, of the counter.

A count value is output by the counter 106 on the lines 112 to be applied to inputs of a read only memory 114. The counter values generated on the lines 112 address selected memory locations of the memory 114, and, once accessed, the contents of the memory locations are supplied, by way of lines 116 and 118 to the tuning circuitry 66 and 76, respectively. The contents of the memory locations are of paired values to cause the adaptive characteristics of the equalizing filter 64 and the gain of the amplifier circuit 28 to be of selected levels.

As the counter counts up or counts down, different memory locations of the memory 114 are addressed, and different values of the adaptive characteristics of the equalizer circuit 24 and different values of the amplifier circuit 28 are caused to be selected. Once the size of the envelope detected by the envelope magnitude detector 36 is of a desired size, within a tolerance level, the counter 106 is no longer enabled, the memory locations of the memory 114 which are addressed are not changed, and the values of the adaptive characteristics of the equalizer circuit 24 and the value of the gain of the amplifier circuit 28 are no longer changed. Thereby, the characteristics of the equalizer and amplifier circuits 24 and 28 and their respective transfer characteristics are adaptively controlled.

Figure 6:
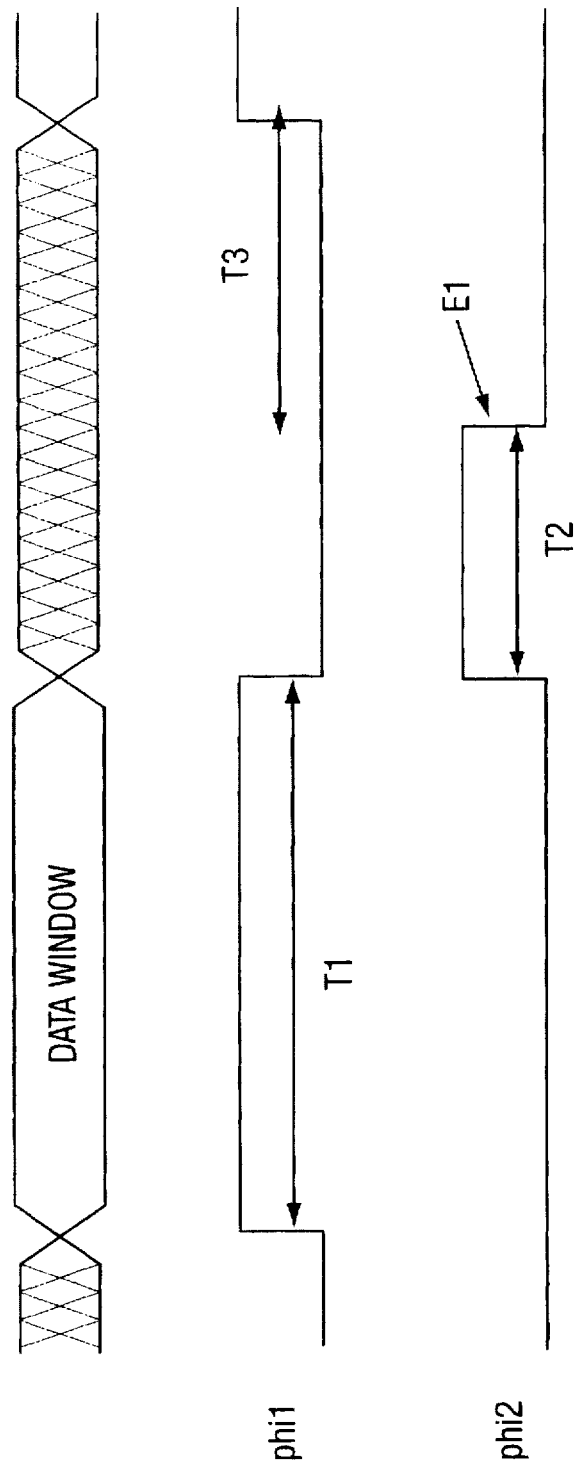
FIG. 6 is a timing diagram illustrating the relationship between various signals applied to the circuitry shown in FIG. 5.

The timing diagram of FIG. 6 illustrates the relationship between the signals generated by the timing generator 86 relative to a data signal 122 received by the receiver 18. The first timing signal, $\phi_1$, is applied to the sample and hold circuit 84. The duration of the timing signal is of a fixed length, and values of the magnitude of the envelope of the data signal 122 is stored in the sample and hold circuit 84 during the duration of the timing signal.

Thereafter, the second timing signal, $\phi_2$, is generated. During this second time period, the magnitudes stored by the sample and hold circuit 84 are held, operations to update the enable and down inputs of the counter 106 are completed. At the falling edge of the second timing signal, the count input of the counter 106 is triggered and, during the time period indicated by $T_3$ in the figure, the equalizer and amplifier circuits 24 and 28 are tuned.

Figure 7:
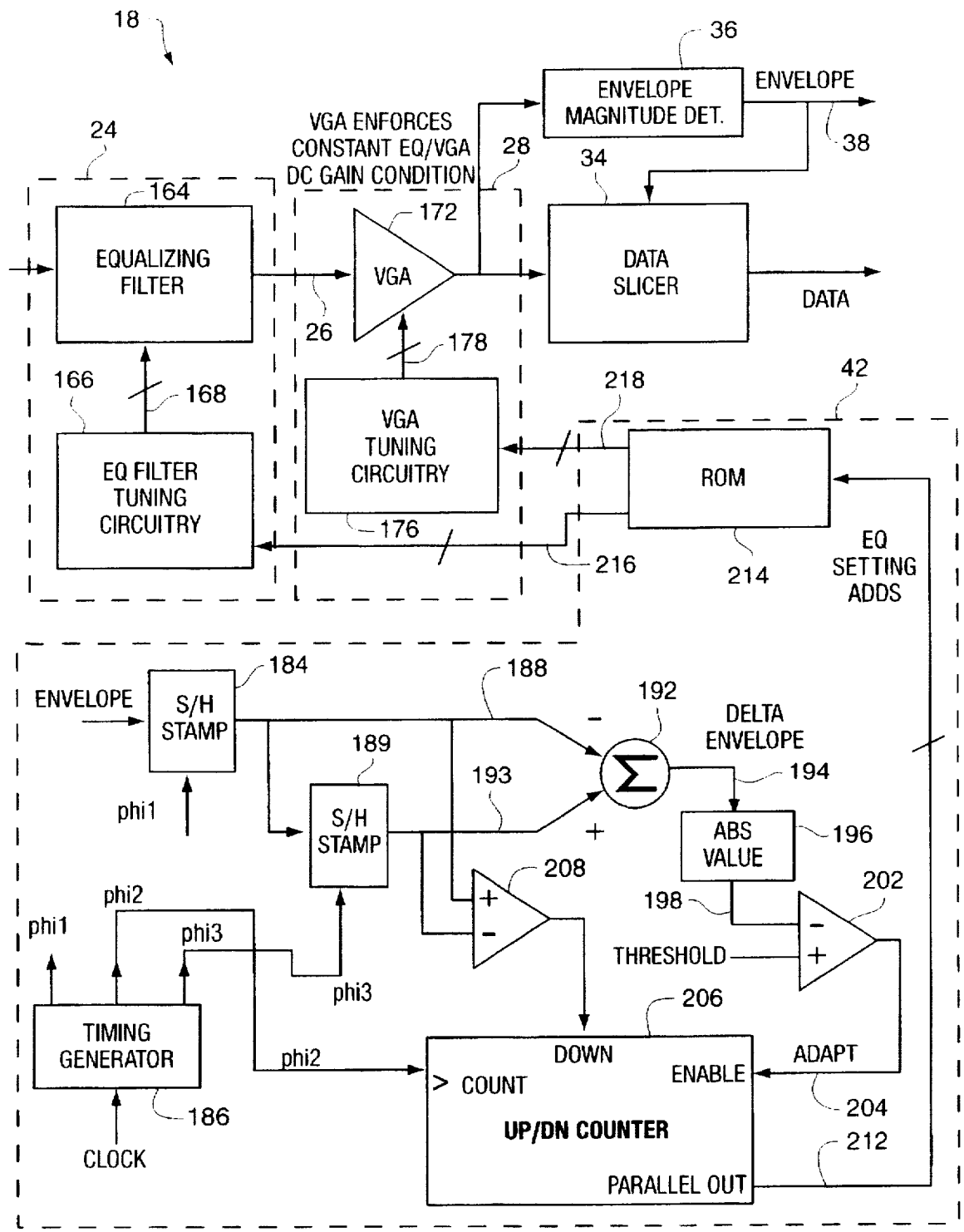
FIG. 7 is a functional block diagram, similar to that shown in FIG. 5, but of another embodiment of the present invention which also counteracts for the effects of signal degradation of a signal transmitted upon a non-ideal transmission channel.

FIG. 7 illustrates portions of the receiver 18 of another embodiment of the present invention. Again, the receiver 18 includes an equalizer circuit 24 coupled to a variable gain amplifier circuit 28 by way of line 26, a data slicer 34 and envelope magnitude detector 36 coupled to the amplifier circuit 28 by way of line 32, and adaptive circuitry 42 coupled to the detector 36.

The equalizer circuit 24 includes an equalizing filter 164 to receive a signal representative of a receive signal received by the receiver. The adaptive characteristics of the equalizing filter 164 are controlled by the equalizing filter tuning circuitry 166. That is to say, the transfer characteristics of the filter 164 are controlled by the tuning circuitry 166. The tuning circuitry 166 is coupled to the filter 164 by way of the lines 168.

The equalizer circuit 24 generates an equalized signal on line 26 which is applied to the amplifier circuit 28. The variable gain amplifier circuit 28 includes a variable gain amplifier 172 having gain characteristics and, hence, transfer characteristics controlled by variable gain amplifier tuning circuitry 176. The tuning circuitry 176 is coupled to the amplifier 172 by way of the lines 178. The gain of the amplifier 172 is controlled such that the composite DC gain of the equalizing filter 164 and the amplifier 172 is a constant for any setting of the equalizing filter 164.

The amplifier circuit 28 generates an amplified signal on line 32 which is coupled to the data slicer 34 and also to the envelope magnitude detector 36. The data slicer 34 is operative in conventional manner, and the detector 36 is operative to detect the size of the envelope of the data signal forming the receive signal applied to the receiver 18, once equalized and amplified. A signal representative of the detected envelope size is generated on the line 38. The line 38 is coupled to an input of the data slicer 34 and also to a sample and hold circuit 184.

The sample and hold circuit is operative in a manner similar to the sample and hold circuit 84 shown in FIG. 5 to sample and hold the values of the signals generated on line 38 for a time period determined by the duration of a first timing pulse, $\phi_1$. Values of the sampled signal held by the circuit 184 are generated on line 188 to be applied to a second sample and hold circuit 189 and also to a negative input of a summer 192.

The second sample and hold circuit 189 is operative to sample and hold values of the signal supplied thereto during a second time period defined by the duration of pulses of a timing signal, $\phi_3$. The timing signal $\phi_3$ is also generated by the timing generator 186. As shall be noted below, the pulses of the timing signals applied to the circuits 184 and 189 are offset from one another. Values of the signal held by the circuit 189 are applied to a positive input of the summer 192 on line 193. Because the pulses of the timing signals applied to the circuits 184 and 189 are offset from one another, the summer 192 determines differences in values of sequential portions of the data signal.

Signals representative of the determined difference are generated on line 194, and the absolute value of the difference is determined by the absolute value determiner 196. The absolute value of the difference signal is generated on line 198 and applied to an input of a comparator 202. A threshold value is applied to a second input of the comparator 202. When the absolute value of the difference signal exceeds the threshold value, the comparator generates a signal on the line 204 which is coupled to an enable input of an up/down counter 206.

The lines 188 and 193 are also coupled to inputs of a comparator 208. An output of the comparator 208 is coupled to a down input of the counter 206. And, a timing signal, $\phi_2$, is applied to a count input of the counter 206. When a signal is applied to the enable input of the counter together with application of the timing signal to the counter, the counter counts up or counts down depending on whether a signal is applied to the down input of the counter. The counter 206 is thereby operative in the same manner as operation of the counter 106 shown in FIG. 5.

Count signals are generated by the counter 206 on the lines 212 for application to a read only memory 214. The memory 214 is operative in manners analogous to operation of the memory 114, here to generate signals on lines 216 and 218 which are coupled to the tuning circuitry 166 and 176, respectively. Again, the count value of the count signal generated by the counter, here counter 206, is used to select addressing of particular memory locations of the memory 214. The adaptive characteristics and gain of the circuits 24 and 28 and their respective transfer characteristics are thereby controlled by the values of data stored in the selected memory locations of the memory 214.

The embodiments of FIGS. 5 and 7 differ only in the manner by which the difference signal generated by the summing devices 92 and 192 of the respective embodiments are determined. In the embodiment of FIG. 5, the sizes of the signal envelope are determined relative to selected target values. In the embodiment of FIG. 7, the difference signal determines changes in the size of the signal envelope. By appropriate selection of the threshold value applied to the comparator 202, the adaptive circuitry 42 of the embodiment of FIG. 7 can be utilized to determine the knee section 62 of the curve 54 shown in FIG. 4.

Figure 8:
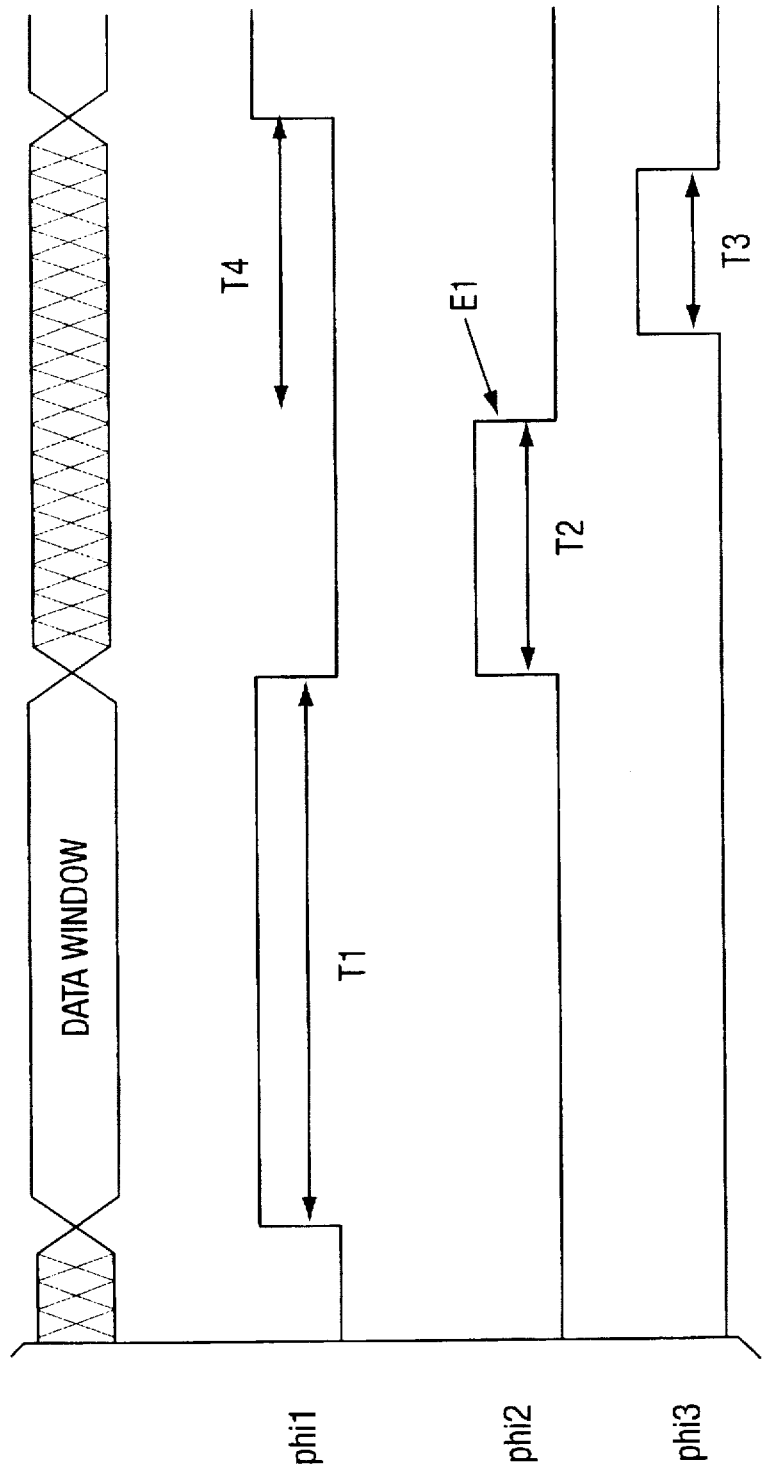
FIG. 8 is a timing diagram illustrating the relationship between various signals applied to the circuitry shown in FIG. 7.

The timing diagrams of FIG. 8 illustrate the relationship between the timing signals generated by the timing generator 186 forming a portion of the receiver 18 shown in FIG. 7. A signal representative of a data signal is stored in the sample and hold circuit 184 when a pulse of the first timing signal $\phi_1$ is generated. The sample and hold circuit 189 samples and holds a signal applied thereto when the second timing signal $\phi_2$ is generated. Because the pulses of the first and second timing signals are offset relative to one another, the circuits 184 and 189 sample and hold sequential portions of signals applied thereto.

As illustrated in the figure, during time $T_1$, the detector 36 samples the envelope of the signal generated on line 32 with existing adaptive equalization characteristics and gain characteristics of the circuitry 24 and 28. During time period $T_2$, the envelope is held and updating of the enable and down inputs of the counter 206 are completed. During the falling edge, $E_1$ of pulses of the timing signal $\phi_2$, the count input of the counter 206 is triggered. During time $T_3$, the present envelope is sampled into the new value of a preceding envelope, and, during time period $T_4$, the equalizer circuit 24 is tuned to a new setting.

Because the present invention utilizes detection of the size of the signal envelope of the data signals transmitted upon the transmission channels, the circuit is of minimal complexity and the data signal can be assumed to be formed of random data during the adaption process of selecting the characteristics of the adaptive and variable circuitry. The circuitry and method of the present invention can also be advantageously utilized in a receiver receiving data signals having data encoded by a wide variety of signaling schemes. The circuitry is amenable to both analog and digital realization and is robust over channel variations of the transmission channel and in manufacturing variations in the receiver in which the circuitry is embodied.

Presently-preferred embodiments of the present invention have been described with a degree of particularity. The previous descriptions are of preferred examples for implementing the invention, and the scope of the invention should not necessarily be limited by this description. The scope of the present invention is defined by the following claims.

What is claimed is:

1. Receiver circuitry for receiving a data signal transmitted upon a transmission channel, said receiver circuitry comprising:

an adaptive equalizer circuit having selectable adaptive characteristics and coupled to receive a receive signal representative of the data signal, said adaptive equalizer for equalizing the receive signal and for generating an equalized signal;

a variable gain amplifier circuit having selectable variable gain characteristics and coupled to receive the equalized signal, said variable gain amplifier circuit for amplifying the equalized signal and for forming an amplified signal;

a signal detector coupled to detect a signal envelope of at least a portion of either the equalized signal or the amplified signal, wherein the signal envelope detected by said signal detector is utilized to select the selectable adaptive characteristics of said adaptive equalizer and to select the selectable gain characteristics of said variable gain amplifier.

2. The receiver circuitry of claim 1 wherein said adaptive equalizer circuit further comprises an equalizer tuner circuit, said equalizer tuner circuit operative responsive to the detected sizes of the signal envelopes for altering the selectable characteristics of said adaptive equalizer circuit.

3. The receiver circuitry of claim 1 wherein the selectable characteristics of said adaptive equalizer circuit comprise transfer characteristics.

4. The receiver circuitry of claim 1 wherein said variable gain amplifier circuit further comprises a variable gain amplifier tuner circuit, said variable gain amplifier tuner circuit operative responsive to the detected sizes of the signal envelopes for altering the gain characteristics of said variable gain amplifier circuit.

5. The receiver circuitry of claim 1 further comprising comparator circuitry for comparing values of sizes of the signal envelopes detected by said signal detector with values representative of sizes of a signal envelope of a target envelope.

6. The receiver circuitry of claim 1 wherein said variable gain amplifier circuit comprises a first variable gain amplifier and a second variable gain amplifier, said first variable gain amplifier having first gain characteristics of values corresponding to an expected gain of the adaptive characteristics of said adaptive equalizer circuit.

7. The receiver circuitry of claim 1 further comprising a memory element containing data representative of selected values of the selectable characteristics of said adaptive equalizer circuit and of selected values of the variable gain characteristics, said memory element coupled to said adaptive equalizer circuit and to said variable gain amplifier circuit, respectively, for supplying individual ones of the selected values of the data stored therein responsive to the sizes of the signal envelopes detected by said signal detector to said adaptive equalizer and said variable gain amplifier.

8. The receiver circuitry of claim 7 further comprising comparator circuitry for comparing values of sizes of the signal envelope detected by said envelope detector during successive time periods.

9. The receiver circuitry of claim 8 wherein said comparator circuitry compares the values of the sizes of the signal envelope during a first time period and during a second time period, the second time period subsequent to the first time period and after values of the selectable characteristics of said adaptive equalizer circuit and the gain of said variable gain amplifier circuit are altered relative to values of the selectable characteristics and of the gain during the first time period and for generating comparison signals responsive thereto.

10. The receiver circuitry of claim 9 wherein said comparator circuitry comprises a first sample and hold circuit for sampling and holding the sizes of the signal envelopes detected by said envelope detector and a second sample and hold circuit coupled to said first sample and hold circuit, said second sample and hold circuit also for sampling and holding the sizes of the signal envelopes detected by said envelope detector.

11. The receiver circuitry of claim 10 wherein said comparator circuitry further comprises a summer having negative and positive inputs coupled to said first and second sample and hold circuits, respectively, said summer for generating the comparison signal.

12. The receiver circuitry of claim 11 further comprising a counter circuit for generating an output count signal of values responsive to values of the comparison signal, said output count signal of either an incrementing value or a decrementing value when the comparison signal is of a magnitude greater than a tolerance value.

13. The receiver circuitry of claim 12 wherein the output count signal is applied to said memory element wherein the data contained by said memory element is indexed by values of the output count signal and wherein the individual ones of the selected values of the data supplied to said adaptive equalizer circuit and to said variable gain amplifier circuit are selected responsive to values of the output count signal.

14. The receiver circuitry of claim 1 further comprising comparator circuitry for comparing values of sizes of the signal envelopes detected by said signal detector with values representative of sizes of a signal envelope of a target envelope and for generating comparison signals of values responsive to comparisons performed thereat.

15. The receiver circuitry of claim 14 further comprising a counter circuit for generating an output count signal of values responsive to values of the comparison signals, said output count signal of either an incrementing value or a decrementing value when the comparison signal is of a magnitude greater than a tolerance value.

16. The receiver circuitry of claim 15 wherein the output count signal is applied to said memory element wherein the data contained by said memory element is indexed by values of the output count signal and wherein the individual ones of the selected values of the data supplied to said adaptive equalizer circuit and to said variable gain amplifier circuit are selected responsive to values of the output count signal.

17. A method for adaptively correcting for signal degradation of a data signal transmitted upon a transmission channel and received at a receiver, said method comprising the steps of:

equalizing a receive signal representative of the data signal with an adaptive equalizer circuit having selectable characteristics;

amplifying the receive signal, once equalized by the adaptive equalizer, with a variable gain amplifier having selectable gain characteristics;

detecting a signal envelope of at least a portion of the receive signal, once amplified by the variable gain amplifier; and selecting values of the selectable characteristics of the adaptive equalizer and values of the gain of the variable gain amplifier responsive to the signal envelope.

18. The method of claim 17 further comprising the additional step, prior to said step of selecting, of comparing values of sizes of the signal envelope detected during said step of detecting with values representative of sizes of a signal envelope of a target envelope and wherein the values of the selectable characteristics of the adaptive equalizer and the values of the gain of the variable gain amplifier selected during said step of selecting are selected responsive to comparisons performed during said step of comparing.

19. The method of claim 17 further comprising the additional step, prior to said step of selecting, of comparing values of sizes of the signal envelope detected during said step of detecting during successive time periods and wherein the values of the selectable characteristics of the adaptive equalizer and the values of the gain of the variable gain amplifier selected during said step of selecting are selected responsive to comparisons performed during said step of comparing.

20. In a local area network having local area network transceivers coupled to theretogether by wire pairs, a combination with each of the local area network transceivers of circuitry for adaptively correcting for signal degradation of data signal transmitted upon the wire pairs, said circuitry comprising:

- an adaptive equalizer circuit having adaptive characteristics and coupled to receive a receive signal representative of the data signal, said adaptive equalizer for equalizing the receive signal and for generating an equalized signal;
- a variable gain amplifier circuit having variable gain characteristics and coupled to receive the equalized signal, said variable gain amplifier circuit for amplifying the equalized signal and for forming an amplified signal; and
- a detector coupled to detect a signal envelope of at least a portion of the amplified signal, wherein the signal envelope detected by said detector is utilized to select the adaptive characteristics of said adaptive equalizer and to select the variable gain characteristics of said variable gain amplifier.

21. Apparatus for adaptively correcting for signal degradation of a data signal transmitted upon a transmission channel and received at a receiver, said apparatus comprising:

- means for equalizing a receive signal representative of the data signal with an adaptive equalizer circuit having selectable characteristics;
- means for amplifying the receive signal, once equalized by the adaptive equalizer, with a variable gain amplifier having selectable gain characteristics;
- means for detecting sizes of signal envelopes of the receive signal, once amplified by the variable gain amplifier; and
- means for selecting values of the selectable characteristics of the adaptive equalizer and values of the gain of the variable gain amplifier responsive to the sizes of the signal envelopes.

22. The apparatus of claim 21 further comprising the means for comparing values of the sizes of the signal envelope detected by said means for detecting with values representative of sizes of a signal envelope of a target envelope and wherein the values of the selectable characteristics of the adaptive equalizer and the values of the gain of the variable gain amplifier selected by said means for selecting are selected responsive to comparisons performed by said means for comparing.

23. The apparatus of claim 21 further comprising the means for comparing values of the sizes of the signal envelope detected by said means for detecting during successive time periods and wherein the values of the selectable characteristics of the adaptive equalizer and the values of the gain of the variable gain amplifier selected by said means for selecting are selected responsive to comparisons performed by said means for comparing.

* * * * *